United States Patent
Werner et al.

(10) Patent No.: US 11,444,741 B2
(45) Date of Patent: Sep. 13, 2022

(54) UNIFIED SCRAMBLING OF REFERENCE SIGNALS

(71) Applicant: Telefonaktiebolaget LM Ericsson (publ), Stockholm (SE)

(72) Inventors: Karl Werner, Segeltorp (SE); Mattias Frenne, Uppsala (SE); Stephen Grant, Pleasanton, GA (US); Lars Lindbom, Karlstad (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/646,447

(22) PCT Filed: Oct. 1, 2018

(86) PCT No.: PCT/SE2018/051003
§ 371 (c)(1),
(2) Date: Mar. 11, 2020

(87) PCT Pub. No.: WO2019/070183
PCT Pub. Date: Apr. 11, 2019

(65) Prior Publication Data
US 2020/0274680 A1    Aug. 27, 2020

Related U.S. Application Data

(60) Provisional application No. 62/567,000, filed on Oct. 2, 2017.

(51) Int. Cl.
*H04L 5/00* (2006.01)
*H04B 7/06* (2006.01)
*H04L 27/26* (2006.01)

(52) U.S. Cl.
CPC ......... *H04L 5/0094* (2013.01); *H04B 7/0626* (2013.01); *H04L 5/0048* (2013.01); *H04L 27/2613* (2013.01)

(58) Field of Classification Search
CPC .......................... H04L 5/0048; H04L 27/2613
See application file for complete search history.

(56) References Cited

U.S. PATENT DOCUMENTS 9,131,394 B2 *  9/2015  Ito ........................... H04W 24/02
9,680,988 B2 *  6/2017  Xia ........................ H04M 3/26
(Continued)

FOREIGN PATENT DOCUMENTS

EP    2 827 669 A1    1/2015
WO   2013 147430 A1   3/2013

OTHER PUBLICATIONS

R1-1710457 Huawei, "Consideration on UE-specific RS Sequence Design", Jun. 2017 pp. 1-4.*
(Continued)

*Primary Examiner* — Sophia Vlahos
(74) *Attorney, Agent, or Firm* — Baker Botts, LLP

(57) ABSTRACT

According to certain embodiments, a method in a radio node includes obtaining a parameter associated with a reference signal type and using the parameter associated with the reference signal type to calculate an initial value, $C_{init}$, for a reference signal. A reference signal sequence is generated using $C_{init}$, and the reference signal is demodulated using the reference signal sequence.

26 Claims, 10 Drawing Sheets

(56) References Cited

U.S. PATENT DOCUMENTS

| | | | |
|---|---|---|---|
| 9,681,312 B2* | 6/2017 | Liu | H04L 25/0226 |
| 2009/0129322 A1* | 5/2009 | Suwa | H04W 28/24 |
| | | | 370/329 |
| 2012/0314686 A1* | 12/2012 | Huang | H04W 8/26 |
| | | | 370/330 |
| 2013/0114536 A1 | 5/2013 | Yoon | |
| 2013/0301452 A1* | 11/2013 | Yoon | H04L 5/0048 |
| | | | 370/252 |
| 2014/0098691 A1* | 4/2014 | Kazmi | H04W 24/10 |
| | | | 370/252 |
| 2014/0153515 A1* | 6/2014 | Chun | H04L 5/0094 |
| | | | 370/329 |
| 2014/0247775 A1* | 9/2014 | Frenne | H04L 25/0226 |
| | | | 370/329 |
| 2015/0049824 A1* | 2/2015 | Kim | H04B 7/0695 |
| | | | 375/267 |
| 2017/0111150 A1 | 4/2017 | Han et al. | |
| 2017/0289936 A1* | 10/2017 | Chae | H04W 56/001 |
| 2018/0048413 A1* | 2/2018 | Liu | H04W 48/18 |
| 2018/0091277 A1* | 3/2018 | Davydov | H04L 27/18 |
| 2018/0249339 A1* | 8/2018 | Noh | H04W 16/14 |
| 2018/0367358 A1* | 12/2018 | Baligh | H04L 5/0057 |
| 2019/0044669 A1* | 2/2019 | Davydov | H04L 5/005 |

OTHER PUBLICATIONS

PCT International Search Report for International application No. PCT/SE2018/051003—dated Feb. 18, 2019.

PCT Written Opinion of the International Searching Authority for International application No. PCT/SE2018/051003—dated Feb. 18, 2019.

Extended European Search Report issued for Application No./ Patent No. 18864778.8 -1216 / 3692678 PCT/SE2018051003—dated May 31, 2021.

3GPP TSG RAN WG1 Meeting #90; Prague, Czech Republic; Source: Huawei, HiSilicon; Title: CSI-RS design in NR (R1-1712248)—dated Aug. 21-25, 2017.

3GPP TSG RAN WG1 NR Ad-Hoc #3; Nagoya, Japan; Source: Huawei, HiSilicon; Title: Considerations on UE-specific RS Sequence Design (R1-1715600)—dated Sep. 18-21, 2017.

* cited by examiner

FIGURE 2

UNIFIED SCRAMBLING OF REFERENCE SIGNALS

PRIORITY

This nonprovisional application is a U.S. National Stage Filing under 35 U.S.C. § 371 of International Patent Application Serial No. PCT/SE2018/051003 filed Oct. 1, 2018 and entitled "UNIFIED SCRAMBLING OF REFERENCE SIGNALS" which claims priority to U.S. Provisional Patent Application No. 62/567,000 filed Oct. 2, 2017 both of which are hereby incorporated by reference in their entirety.

TECHNICAL FIELD

Embodiments of the present disclosure relate generally to wireless communication and, more specifically, to unified scrambling of reference signals.

BACKGROUND

The physical layer of new radio (NR)—the 3GPP 5G mobile radio systems—is expected to handle a vast number of different transmission scenarios by operating in the frequency range from below 1 GHz to 100 GHz. Carrier frequencies above 6 GHz are not supported by LTE, so NR requires a new and flexible design for the physical layer which offers good performance in a wider range of frequencies compared the physical layer of LTE.

In mobile radio systems like LTE and NR, a reference signal (RS) is typically transmitted to aid radio channel knowledge but can also be transmitted for tracking impairments induced by a local oscillator of a transceiver. The design of a reference signal will depend on its use case and several types of reference signals are needed in a mobile radio system. The main purpose of a reference signal will often be reflected by its name. For example, a reference signal designed and used for coherent demodulation of a physical layer channel is referred to as a demodulation reference signal (DM-RS), a reference signal designed and used for acquiring channel state information in downlink is referred to as a channel state information reference signal (CSI-RS), and a reference signal designed for tracking of time and frequency differences between transmitter and receiver is referred to as TRS.

Due to the wide range of use cases envisioned for NR, and also other factors, according to 3GPP agreements, each of the reference signals mentioned above are configurable. The reference signals may occupy many different OFDM symbols and may also occupy different sets of subcarriers in each OFDM symbol.

Associated with each reference signal is a reference signal sequence (RS sequence). The sequence forms the basis of the RE (resource element) symbol values places on the REs configured for the reference signal. The RS sequence needs to be carefully selected to enable a high degree of orthogonality between RS with difference sequences assigned. A key principle is that interference between reference signals transmitted from different transmission points (TRP), should be mutually randomized. This means that the interference experienced by a receiver from RS transmitted from other TRP should behave as noise. This is typically achieved by assigning different RS sequences to different transmission points, and to make the RS sequence a function of time.

With NR, a resource specific paradigm has been adopted for DMRS, CSI-RS and TRS. This means that the RS sequence should be indexed by the subcarrier relative to a global reference point, rather than being indexed relative to the allocation of the associated data transmission. One of the benefits with this paradigm is that orthogonality between sequences assigned to different users may be kept even if the users have only partially overlapping allocations.

For the DL reference signal sequence definition from LTE, the reference-signal sequence r(m) is defined by:

$$r(m) = \frac{1}{\sqrt{2}}(1 - 2 \cdot c(2m)) + j\frac{1}{\sqrt{2}}(1 - 2 \cdot c(2m+1)), m = 0, 1, \ldots$$

where the pseudo-random sequence c(i) is a Gold-31 sequence, where the initial state of the pseudo-random sequence generator will depend on the type of reference signal. In the case of CRS, the pseudo-random sequence generator shall be initialized with:

$$c_{init} = 2^{10} \cdot (7 \cdot (n_s+1)+1+1) \cdot (+2 \cdot N_{ID}^{cell}+1)+2 \cdot N_{ID}^{cell}+N_{CP}$$

where $n_s$ is the slot number within a radio frame and $l$ is the OFDM symbol number within the slot, $N_{ID}^{cell}$ is the physical cell ID and $N_{CP}$ is a bit that depends on the type of CP. Hence, the initial states of the pseudo-random generator will depend on the OFDM symbol within the radio frame, and the physical cell ID will ensure that cells get different CRS sequences.

In the case of CSI-RS, the pseudo-random sequence generator shall be initialized with:

$$c_{init} = 2^{10} \cdot (7 \cdot (n_s'+1)+1+1) \cdot (2 \cdot N_{ID}^{CSI}+1)+2 \cdot N_{ID}^{CSI}+N_{CP}$$

at the start of each OFDM symbol. The quantity $N_{ID}^{CSI}$ equals $N_{ID}^{cell}$ unless configured by higher layers. In NR, the hard coded dependency to the physical cell-ID as in the case of CRS will be removed and instead an identifier configured per UE for each RS will be used, similar to the CSI-RS initialization above. As used herein, this UE specific identifier for each RS may be referred to as the UE specific RSID and denoted as $N_{RSID}$, or more simply, nm.

Depending on configuration, reference signals of different type may be mapped to the same REs and transmitted from different transmission points. In a synchronized network, this means that interference may not be randomized unless care is taken to ensure that RSID differs between all transmission point that may interfere with each other for all RS that may occupy the same RE. Note that this may be a problem even if the overlap in terms of mapped RE is only partial. For example, TRS may only use every 4th subcarrier but DMRS every second. This is because sequences are resource specific. This may become a complex coordination problem, in particular as coordination needs to be done both for all combinations of reference signals, not only per reference signal type.

SUMMARY

Embodiments of the present disclosure provide systems and methods for unified scrambling of reference signals.

According to certain embodiments, a method in a radio node includes obtaining a parameter associated with a reference signal type and using the parameter associated with the reference signal type to calculate an initial value, $C_{init}$, for a reference signal. A reference signal sequence is generated using $C_{init}$, and the reference signal is demodulated using the reference signal sequence.

According to certain embodiments, a radio node includes processing circuitry configured to obtain a parameter associated with a reference signal type and use the parameter associated with the reference signal type to calculate an initial value, $C_{init}$, for a reference signal. A reference signal sequence is generated using $C_{init}$, and the reference signal is demodulated using the reference signal sequence.

According to certain embodiments, a method in a radio node includes obtaining at least two parameters for calculating an initialization value, $C_{init}$, for a reference signal. $C_{init}$ is calculated using an expression:

$$c_{init}=2^X \cdot (l_{counter}) \cdot (2 \cdot n_{ID}+1)+2^Y \cdot n_{ID}+n_{RStype}$$

wherein:
- $n_{RStype}$ is an additional parameter associated with the reference signal type,
- $l_{counter}$ is a symbol counter associated with a time unit of a radio frame,
- $n_{ID}$ is a UE specific reference signal identifier, and
- X and Y comprise first and second parameters affecting different bits in a binary representation of the quantity $C_{init}$.

A reference signal sequence is generated using $C_{init}$ and the reference signal is demodulated using the reference signal sequence.

Certain embodiments of the present disclosure may provide one or more technical advantages. For example, certain embodiments may ensure that interference between reference signals of different types is mutually randomized, without requiring coordination of which RSID are assigned to each reference signal (coordination among reference signals of the same type may still be required). This may significantly simplify RSID assignment to reference signals in a network. With this approach the range of possible RSID for each reference signal may also be defined independently.

BRIEF DESCRIPTION OF THE DRAWINGS

For a more complete understanding of the disclosed embodiments and their features and advantages, reference is now made to the following description, taken in conjunction with the accompanying drawings, in which:

FIG. 2 illustrates example determinations of reference signal (RS) sequences, according to certain embodiments;

DETAILED DESCRIPTION

As explained above, in NR, the various reference signals such as, for example, demodulation reference signal (DMRS), channel state information-reference signal (CSI-RS), and tracking reference signal (TRS), may be highly configurable. However, the various reference signals may be mapped to the same REs and transmitted from different transmission points. This may cause interference that is not randomized in the network. Therefore, there is a need to ensure that interference between reference signals of different types that occupy the same RE will have statistical properties as additive white Gaussian noise.

At a high-level, embodiments of the present disclosure may include receiving an indication (e.g., a bit pattern) of a reference signal (RS) type for use in the computation of an initialization value, $C_{init}$. For example, certain embodiments of the present disclosure may structure the seed definition for RS sequences used for different RSs (such as DMRS, TRS and CSI-RS) so that the seed will always differ by at least one bit for RSs of different type, or different uses of an RS of the same type (such as UL and DL respectively) independent of the configuration of the RSs. This may ensure that interference between RSs of different types that occupy the same reference element (RE) will be noise like independent of the unique ID configured for the reference signal. As such, certain embodiments make planning of the wireless network easier.

Figure 1:
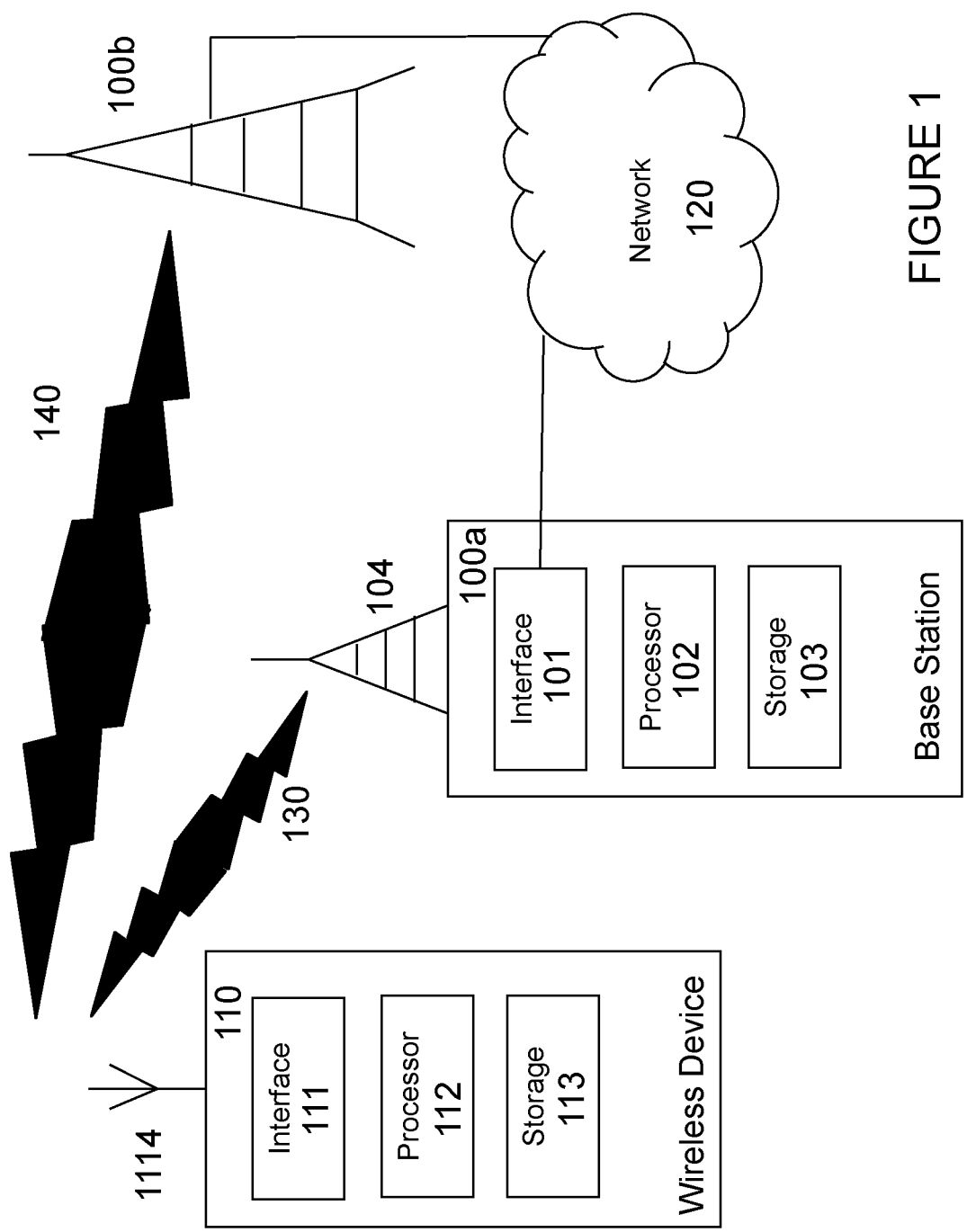
FIG. 1 is a schematic diagram of a wireless communication network, according to certain embodiments.

FIG. 1 is a schematic diagram of a wireless communication network, in accordance with certain embodiments. In the illustrated embodiment, FIG. 1 includes network 120, network nodes 100a-b (network node 100a may be referenced generally as "network node 100"), and wireless device 110. Wireless device 110 may be interchangeably referred to as user equipment (UE) 110. In different embodiments, the wireless network may comprise any number of wired or wireless networks, network nodes, base stations (BS), controllers, wireless devices, relay stations, and/or any other components that may facilitate or participate in the communication of data and/or signals whether via wired or wireless connections.

Network 120 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 100 may refer to any kind of network node 100, which may comprise a Node B, base station (BS), radio base station, multi-standard radio (MSR) radio node such as MSR BS, eNode B, gNode B, network controller, radio network controller (RNC), multi-cell/multicast coordination entity (MCE), base station controller (BSC), relay node, base transceiver station (BTS), access point (AP), radio access point, transmission points, transmission nodes, remote radio unit (RRU), remote radio head (RRH), nodes in distributed antenna system (DAS), core network node (e.g., MSC, MME, SON node, coordinating node, etc.), O&M, OSS, positioning node (e.g., E-SMLC), MDT, an external node (e.g., third-party node, a node external to the current network), or any suitable network node.

Network node 100 comprises interface 101, processor 102, storage 103, and antenna 104. These components are depicted as single boxes located within a single larger box. In practice however, a network node 100 may comprise multiple different physical components that make up a single illustrated component (e.g., interface 101 may comprise terminals for coupling wires for a wired connection and a radio transceiver for a wireless connection). As another example, network node 100 may be a virtual network node in which multiple different physically separate components interact to provide the functionality of network node 100 (e.g., processor 102 may comprise three separate processors located in three separate enclosures, where each processor is responsible for a different function for a particular instance of network node 100). Similarly, network node 100 may be composed of multiple physically separate components (e.g., a NodeB component and a RNC component, a BTS component and a BSC component, etc.), which may each have their own respective processor, storage, and interface components. In certain scenarios in which network node 100 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 100 may be configured to support multiple radio access technologies (RATs). In such embodiments, some components may be duplicated (e.g., separate storage 103 for the different RATs) and some components may be reused (e.g., the same antenna 104 may be shared by the RATs).

Processor 102 may be a combination of one or more of a microprocessor, controller, microcontroller, central processing unit, digital signal processor, application specific integrated circuit, field programmable gate array, processing circuitry, or any other suitable computing device, resource, or combination of hardware, software and/or encoded logic operable to provide, either alone or in conjunction with other network node 100 components, such as storage 103, network node 100 functionality. For example, processor 102 may execute instructions stored in storage 103. Such functionality may include providing various wireless features discussed herein to a wireless devices, such as wireless device 110, including any of the features or benefits disclosed herein.

Storage 103 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 103 may store any suitable instructions, data or information, including software and encoded logic, utilized by network node 100. Storage 103 may be used to store any calculations made by processor 102 and/or any data received via interface 101.

Network node 100 also comprises interface 101, which may be used in the wired or wireless communication of signalling and/or data between network node 100, network 120, and/or wireless device 110. For example, interface 101 may perform any formatting, coding, or translating that may be needed to allow network node 100 to send and receive data from network 120 over a wired connection. Interface 101 may also include a radio transmitter and/or receiver that may be coupled to or a part of antenna 104. The radio may receive digital data that is to be sent out to other network nodes or wireless devices 110 via a wireless connection. The radio may convert the digital data into a radio signal having the appropriate channel and bandwidth parameters. The radio signal may then be transmitted via antenna 104 to the appropriate recipient (e.g., wireless device 110).

Antenna 104 may be any type of antenna capable of transmitting and receiving data and/or signals wirelessly. In some embodiments, antenna 104 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Wireless device 110 may be any type of wireless endpoint, mobile station, mobile phone, wireless local loop phone, smartphone, user equipment (UE), desktop computer, PDA, cell phone, tablet, laptop, VoIP phone, and/or vehicle, which is able to wirelessly send and receive data and/or signals to and from a network node, such as network node 100 and/or other wireless devices 110. For example, wireless device 110 may transmit wireless signals to one or more of network nodes 100*a-b*, and/or receive wireless signals from one or more of network nodes 100*a-b*. The wireless signals may contain voice traffic, data traffic, control signals, and/or any other suitable information. In some embodiments, an area of wireless signal coverage associated with a network node 100 may be referred to as a cell. In some embodiments, wireless device 110 may have device-to-device (D2D) capability. Thus, wireless device 110 may be able to receive signals from and/or transmit signals directly to another wireless device.

Wireless device 110 comprises interface 111, processor 112, storage 113, antenna 114, and power source 115. Like network node 100, the components of wireless device 110 are depicted as single boxes located within a single larger box, however in practice a wireless device may comprises multiple different physical components that make up a single illustrated component (e.g., storage 113 may comprise multiple discrete microchips, each microchip representing a portion of the total storage capacity).

Interface 111 may be used in the wireless communication of signalling and/or data between wireless device 110 and network node 100. For example, interface 111 may perform any formatting, coding, or translating that may be needed to allow wireless device 110 to send and receive data from network node 100 over a wireless connection. Interface 111 may also include a radio transmitter and/or receiver that may be coupled to or a part of antenna 114. The radio may receive digital data that is to be sent out to network node 100 via a wireless connection. The radio may convert the digital data into a radio signal having the appropriate channel and bandwidth parameters. The radio signal may then be transmitted via antenna 114 to network node 100.

Processor 112 may be a combination of one or more of a microprocessor, controller, microcontroller, central processing unit, digital signal processor, application specific integrated circuit, field programmable gate array, processing circuitry, or any other suitable computing device, resource, or combination of hardware, software and/or encoded logic operable to provide, either alone or in combination with other wireless device 110 components, such as storage 113, wireless device 110 functionality. Such functionality may include providing various wireless features discussed herein, including any of the features or benefits disclosed herein.

Storage 113 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 113 may store any suitable data, instructions, or information, including software and encoded logic, utilized by wireless device 110. Storage 113 may be used to store any calculations made by processor 112 and/or any data received via interface 111.

Antenna 114 may be any type of antenna capable of transmitting and receiving data and/or signals wirelessly. In some embodiments, antenna 114 may comprise one or more omni-directional, sector or panel antennas operable to transmit/receive radio signals between 2 GHz and 66 GHz. For simplicity, antenna 114 may be considered a part of interface 111 to the extent that a wireless signal is being used.

Power source 115 may comprise power management circuitry. Power source 115 may receive power from a power supply, which may either be comprised in, or be external to, power source 115. For example, wireless device 110 may comprise a power supply in the form of a battery or battery pack, which is connected to, or integrated in, power source 115. Other types of power sources, such as photovoltaic devices, may also be used. As a further example, wireless device 110 may be connectable to an external power supply (such as an electricity outlet) via an input circuitry or interface such as an electrical cable, whereby the external power supply supplies power to power source 115. Power source 115 may be electrically coupled to interface 111, processor 112, storage 113, and be configured to supply wireless device 110 with power for performing the functionality described herein.

Figure 4:
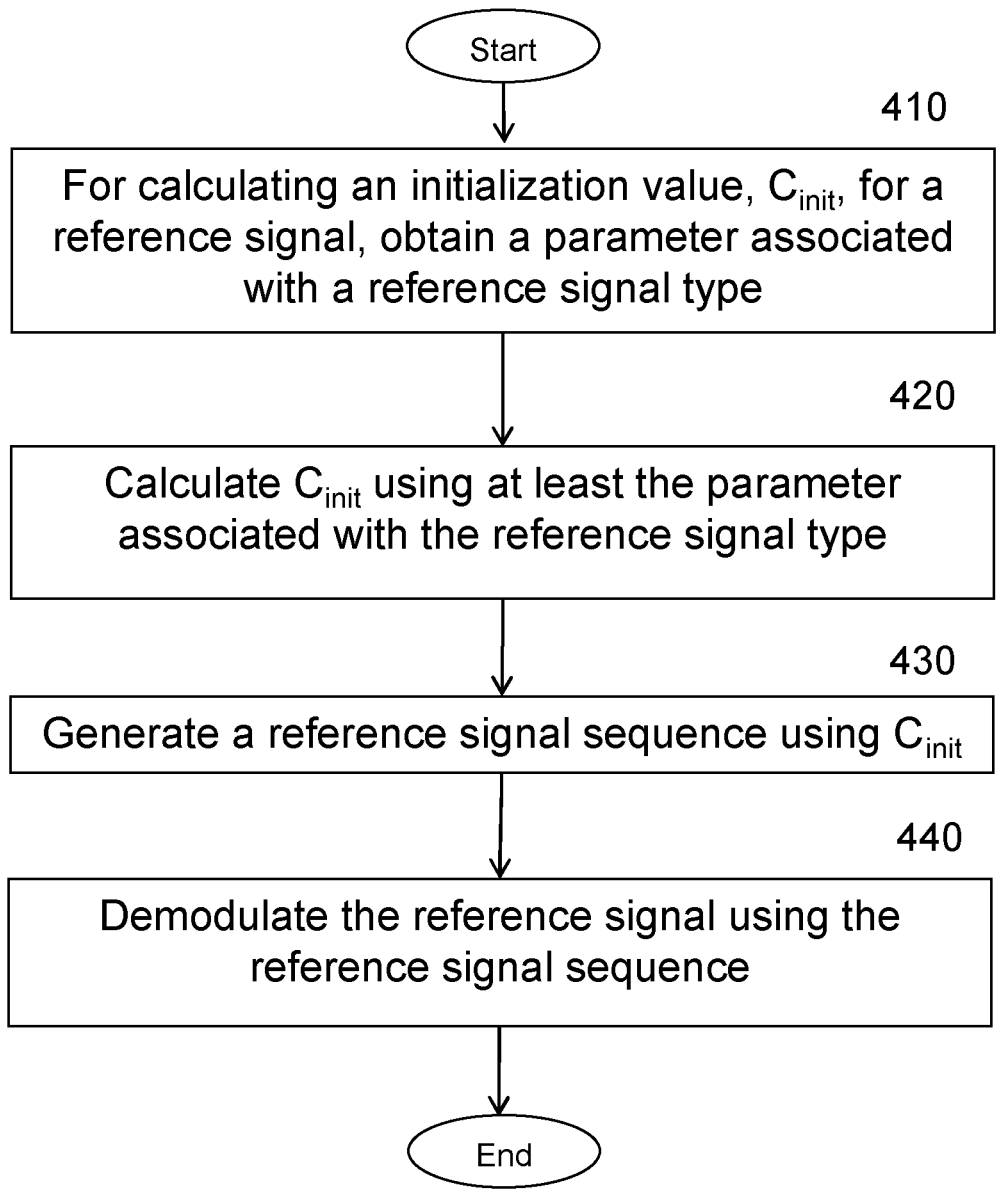
FIG. 4 illustrates an example method by a radio node when receiving a RS, according to certain embodiments.

In certain embodiments, network nodes 100 may interface with a radio network controller. The radio network controller may control network nodes 100 and may provide certain radio resource management functions, mobility management functions, and/or other suitable functions. In certain embodiments, the functions of the radio network controller may be performed by network node 100. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a PSTN, a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof. FIG. 4 describes additional functionality of a radio network controller.

In some embodiments, the core network node may manage the establishment of communication sessions and various other functionalities for wireless device 110. Wireless device 110 may exchange certain signals with the core network node using the non-access stratum (NAS) layer. In non-access stratum signaling, signals between wireless devices 110 and the core network node may be transparently passed through the radio access network. In certain embodiments, network nodes 100 may interface with one or more network nodes over an internode interface. For example, network nodes 100a and 100b may interface over an X2 interface.

Although FIG. 1 illustrates a particular arrangement of a wireless network 100, the present disclosure contemplates that the various embodiments described herein may be applied to a variety of networks having any suitable configuration. For example, the wireless network may include any suitable number of wireless devices 110 and network nodes 100, as well as any additional elements suitable to support communication between wireless devices or between a wireless device and another communication device (such as a landline telephone). Furthermore, the embodiments may be implemented in any appropriate type of telecommunication system supporting any suitable communication standards and using any suitable components, and are applicable to any RAT or multi-RAT systems in which the wireless device receives and/or transmits signals (e.g., data). For example, the various embodiments described herein may be applicable to NR, 5G, LTE, LTE-Advanced, UMTS, HSPA, GSM, cdma2000, WiMax, WiFi, another suitable radio access technology, or any suitable network.

As explained above, certain embodiments of the present disclosure provide systems and methods for unified scrambling of RS s. For instance, in some embodiments, an indication of the RS type is used in the computation of $C_{init}$. According to one embodiment, the $C_{init}$ for a reference signal (in the example DMRS) may be calculated according to equation 1:

$$c_{init}=2^X \cdot (l_{counter}) \cdot (2 \cdot N_{RSID}+1)+2^Y \cdot N_{RSID}+n_{RStype} \quad \text{(Eq. 1)}$$

Where $n_{RStype}$ takes one value for DMRS, a second value for TRS, and a third value for CSI-RS. The values of X and Y may be fixed and set to make the different terms of the expressing non-overlapping in a binary representation. In certain embodiments, Y represents the number of bits allocated to $n_{RStype}$. The parameter $N_{RSID}$ may be referred to as RSID in the text above—an identifier signaled from the network node 100 to the wireless device 110 in connected mode that allows it to determine it sequence. As used herein, $N_{RSID}$ and $n_{ID}$ may be used interchangeably. A default parameter value may also be used before receiving the UE specifically configured value of this parameter. The parameter, $l_{counter}$, is a symbol counter (that may be defined with a certain wrap-around limit) associated with a time unit of a radio frame but could also be associated with another time unit such as slot or subframe or a part of a radio frame. Although the above embodiment is described according to equation 1, it is recognized that the terms in equation 1 may take different forms.

According to certain other embodiments, $C_{init}$ may be expressed as shown in equation 2:

$$c_{init}=2^X \cdot \text{XOR}((l_{counter}) \cdot (2 \cdot N_{RSID}+1), n_{RStype})+2^Y \cdot N_{RSID} \quad \text{(Eq. 2)}$$

In equation 2, Y may be equal to 0. This may ensure that the RS sequence of two reference signals do not coincide in the same symbol. The advantage of this approach is that no extra bits are used to ensure randomized interference between RS of different type, even if $N_{RSID}$ is identical for two types of RS.

According to still other embodiments, $C_{init}$ may be a function of the $n_{RStype}$. Thus, embodiments of the present disclosure may be expressed according to equation 3:

$$c_{init}=2^{10} \cdot f((l+14 \cdot n_s) \bmod N, n_{ID}, n_{RStype})+n_{ID} \quad \text{(Eq. 3)}$$

As shown in equation 3, in a case of a 31-bit representation of $c_{init}$ and a 10-bit representation of $n_{ID}$, the function $f(\ldots)$ and N are selected to use a maximum of 21 bits, and $n_{ID}$ is a UE 110 specifically configured ID (that may differ for different RS configured for the same UE 110) using maximum 10 bits. The function $f(\ldots)$ may be selected so that $f(l,n_{ID},n_1) \neq f(l,n_{ID},n_2)$ if $n_1 \neq n_2$.

According to certain other embodiments, $C_{init}$ may be determined without the RS specific field $n_{RStype}$. For example, count may be determined as shown in equation 4:

$$c_{init}=2^X \cdot (l_{counter}) \cdot (2 \cdot n_{ID}+1)+2^Y \cdot n_{ID} \quad \text{(Eq. 4)}$$

In embodiments using equation 4, network node 100 may be responsible for ensuring that $n_{ID}$ are unique across all interfering RS of different type. However, this may create undesired dependencies between RS configuration for neighboring transmission points. According to certain embodiments, the admissible ranges of $n_{ID}$ for different references signals may be selected (e.g., predetermined by network node 100, according to certain embodiments) to allow for a flexible deployment. For example, the admissible range for $n_{ID}$ for each RS may start at different base index. In some embodiments, the total range of the admissible $n_{ID}$ may be larger (4 times as large if there are four reference signals).

According to certain embodiments, when indicating DMRS, the parameter $n_{RStype}$ may depend on the particular use of the DMRS. For example, $n_{RStype}$ may depend on the DMRS schedule as for physical downlink shared channel (PDSCH), physical uplink shared channel (PUSCH), physical uplink control channel (PUCCH), physical downlink control channel (PDCCH). Respectively, and for group common PDCCH. In some embodiments, different values may be used depending on whether slot based or mini-slot based scheduling is used (known as PDSCH/PUSCH mapping type A and B respectively).

According to another embodiment, the $n_{RStype}$ parameter, when indicating CSI-RS, depends on the particular use of CSI-RS such as beam management or for channel state information (CSI) acquisition. In the former case, the CSI-RS may be a comb structure, like TRS. In the latter, the structure may be based on an aggregation of components consisting of 2 or 4 adjacent REs.

Figure 2:
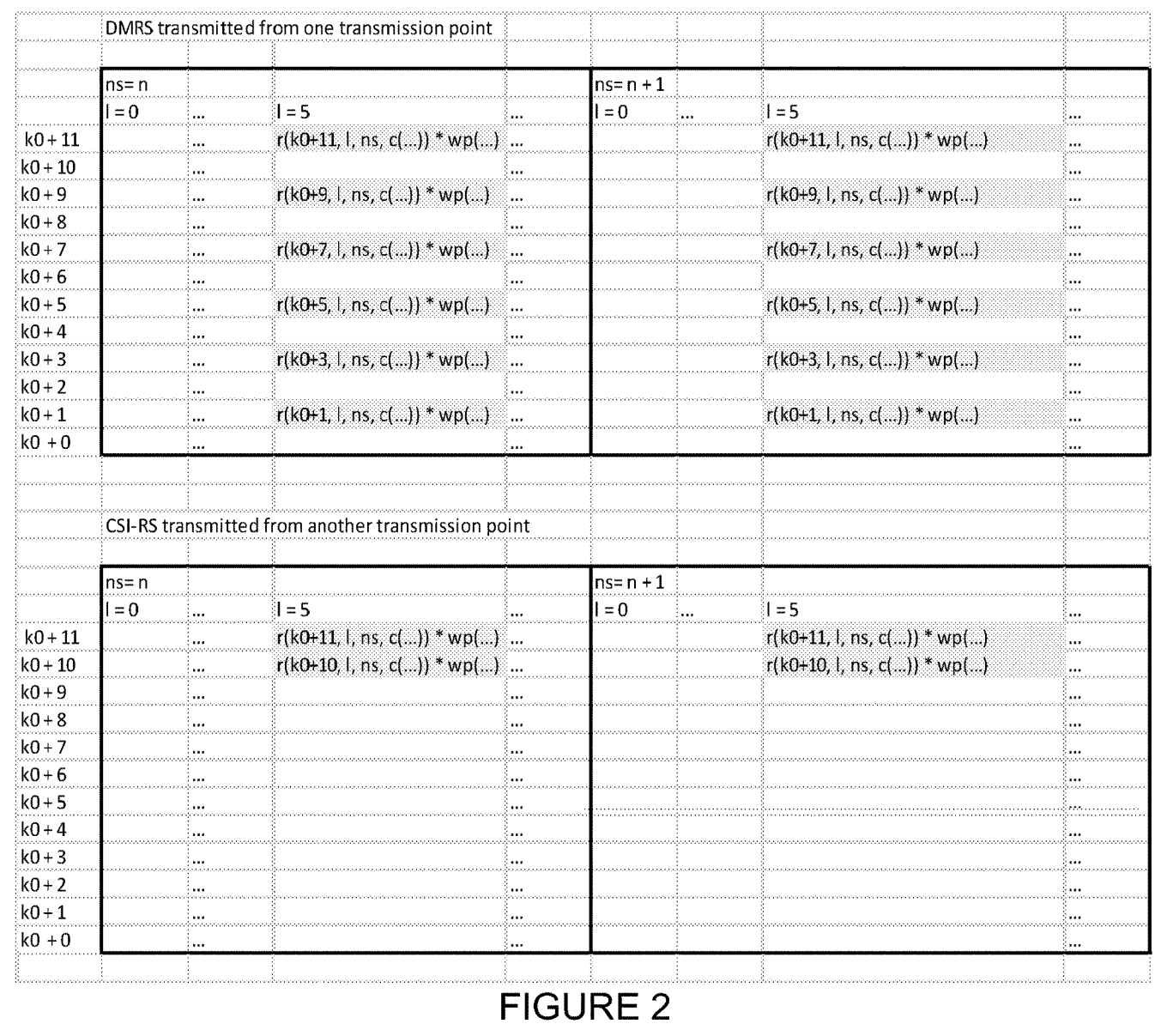

FIG. 2 illustrates example determinations of RS sequences. Specifically, FIG. 2 shows how RS sequences may be mapped for two exemplary RS s, CSI-RS and DMRS. In the illustrated embodiment, wp( . . . ) represents a port specific orthogonal cover code used with CDM of RS ports, and l, ns are time indices (symbol index and slot index). The c( . . . ) function (which may be identical to $C_{init}$ as described above) is crucial if the sequences are to not create mutually non-randomized interference.

Figure 3:
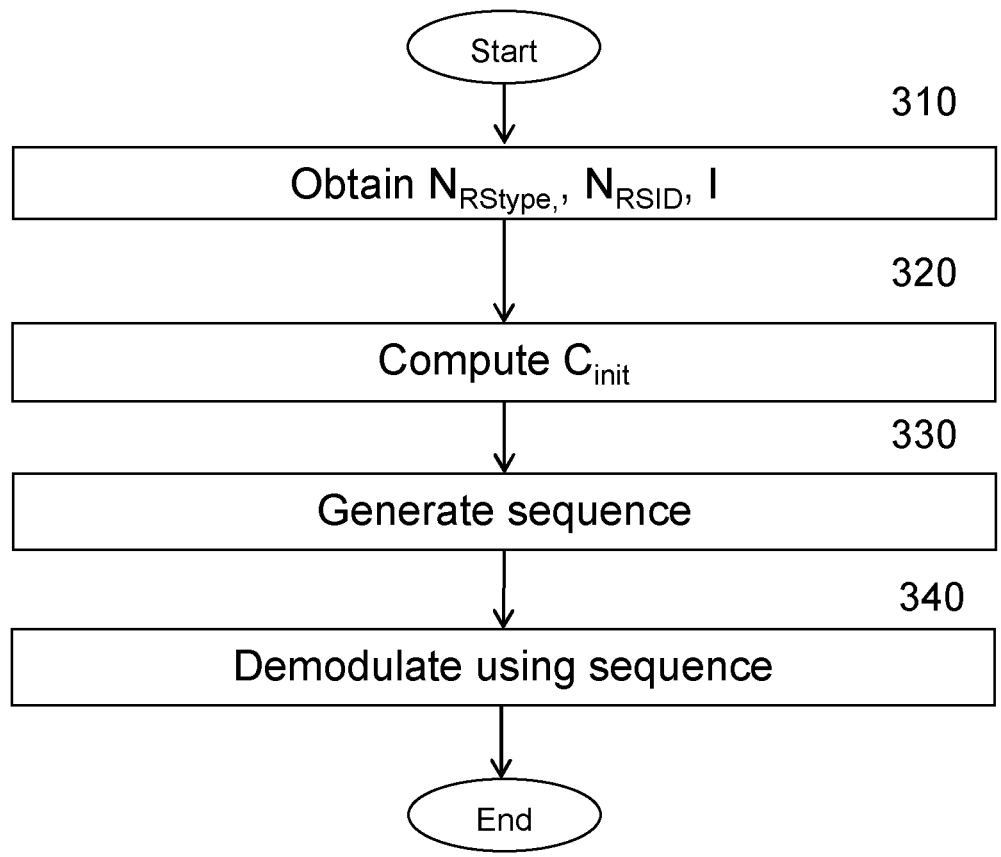
FIG. 3 illustrates an example method by a receiver when receiving a RS, according to certain embodiments.

FIG. 3 illustrates an example method of processing steps performed by a receiver when receiving a reference signal, according to certain embodiments. At step 302, the receiver may obtain $n_{RStype}$, $N_{RSID}$, and/or l. In some embodiments the receiver may be wireless device 110 and $N_{RSID}$ may be received from network node 100. In some embodiments, the receiver may be network node 100. In some embodiments, $N_{RSID}$ may be a specifically configured default value for the receiver (e.g., a specific value associated with wireless device 110).

At step 304, the receiver may computer $C_{init}$. For example, in certain embodiment, the receiver may computer $C_{init}$ according to equation 1 as discussed above. In some embodiments, the values of X and Y in the calculation of $C_{init}$ may be fixed values used by the receiver. In certain embodiments, Y represents the number of bits allocated to $n_{RStype}$. At step 306, the receiver may generate the reference signal sequence using $C_{init}$. At step 308, the receiver may demodulate the reference signal using the reference signal sequence.

FIG. 4 illustrates an example method by a radio node when receiving a RS, according to certain embodiments. In a particular embodiment, the radio node is a wireless device such as, for example, wireless device 110. In another particular embodiment, the radio node is a network node such as, for example, network node 100a or 100b.

At step 410, the radio node obtains a parameter associated with a reference signal type for calculating an initialization value, $C_{init}$, for a reference signal. In a particular embodiment, the reference signal comprises at least one of a CSI-RS, a TRS, a DMRS, and a PRS. In another particular embodiment, the reference signal is a CSI-RS and the parameter associated with the reference signal type is based on a use of the CSI-RS. For example, the use of the CSI-RS may include beam management or CSI acquisition.

At step 420, the radio node calculates $C_{init}$ using at least the parameter associated with the reference signal type. In a particular embodiment, for example, $C_{init}$ is calculated using at least one additional parameter that includes a reference signal identifier, $n_{ID}$, and/or a symbol counter, $l_{counter}$. The reference signal identifier, $n_{ID}$, may be specific to the radio node.

In a particular embodiment, $C_{init}$ may be calculated according to the following equation:

$$c_{init}=2^{X}\cdot(l_{counter})\cdot(2\cdot n_{ID}+1)+2^{Y}\cdot n_{ID}+n_{RStype}$$

wherein:
$n_{RStype}$ is the parameter associated with the reference signal type,
$l_{counter}$ is a symbol counter associated with a time unit of a radio frame, and
X and Y comprise first and second parameters affecting different bits in a binary representation of the quantity $C_{init}$.

In still another particular embodiment, $C_{init}$ may be calculated according to the following equation:

$$c_{init}=2^{X}\cdot\text{XOR}((l_{counter})\cdot(2\cdot n_{ID}+1),n_{RStype})+2^{Y}\cdot n_{ID}$$

wherein:
$n_{RStype}$ is the parameter associated with the reference signal type,
$l_{counter}$ is a symbol counter associated with a time unit of a radio frame, and
X and Y comprise first and second parameters affecting different bits in a binary representation of the quantity $C_{init}$.

In any of the above embodiments, $l_{counter}$ may be associated with a wraparound limit.

In a particular embodiment, a value of the parameter $n_{ID}$ may be received from a network node. Additionally, or alternatively, the value of $n_{ID}$ may be specifically configured for the radio node.

In yet another particular embodiment, $C_{init}$ may be calculated according to the equation:

$$c_{init}=2^{10}\cdot f((l+14\cdot n_s)\bmod N, n_{ID}, n_{RStype})+n_{ID}$$

wherein:
$n_{RStype}$ is the parameter associated with the reference signal type,
l is an OFDM symbol within a 14 symbols slot,
f( . . . ) and N are selected to use a maximum of 21 bits,
$n_{ID}$ is a UE-specific identifier for the reference signal, and
$n_s$ is a slot index within a frame.

At step 430, the radio node generates a reference signal sequence using $C_{init}$.

At step 440, the radio node demodulates the reference signal using the reference signal sequence.

Figure 5:
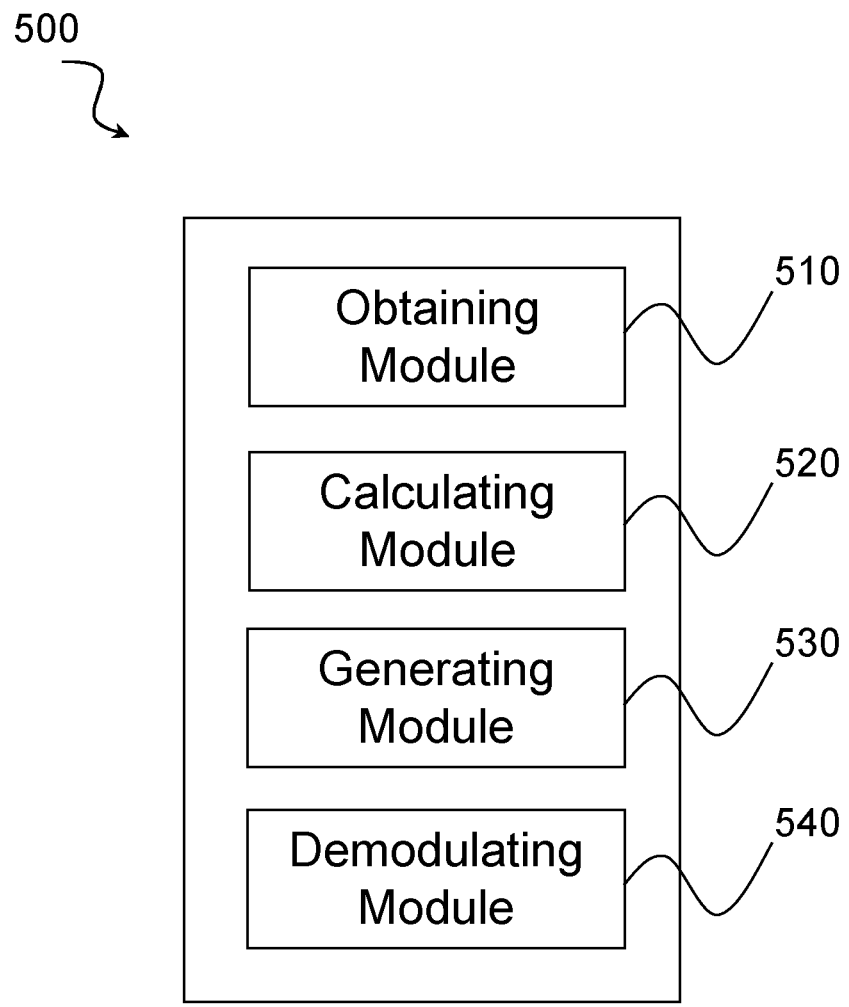
FIG. 5 illustrates a virtual apparatus in a wireless network, according to certain embodiments.

FIG. 5 illustrates a schematic block diagram of a virtual apparatus 500 in a wireless network (for example, the wireless network shown in FIG. 1). The apparatus may be implemented in a wireless device or network node (e.g., wireless device 110 or network node 120 shown in FIG. 1). Apparatus 500 is operable to carry out the example method described with reference to FIG. 4 and possibly any other processes or methods disclosed herein. It is also to be understood that the method of FIG. 4 is not necessarily carried out solely by apparatus 500. At least some operations of the method can be performed by one or more other entities.

Virtual Apparatus 500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 510, calculating module 520, generating module 530, demodulating module 540, and any other suitable units of apparatus 500 to perform corresponding functions according one or more embodiments of the present disclosure.

According to certain embodiments, obtaining module 510 may perform certain of the obtaining functions of the apparatus 500. For example, obtaining module 510 may obtain a parameter associated with a reference signal type for calculating an initialization value, $C_{init}$, for a reference signal.

According to certain embodiments, calculating module 520 may perform certain of the calculating functions of the apparatus 500. For example, calculating module 520 may calculate Gilt using at least the parameter associated with the reference signal type.

According to certain embodiments, generating module 530 may perform certain of the generating functions of the apparatus 500. For example, generating module 530 may generate a reference signal sequence using $C_{init}$.

According to certain embodiments, demodulating module 540 may perform certain of the demodulating functions of the apparatus 500. For example, demodulating module 540 may demodulate the reference signal using the reference signal sequence.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 6:
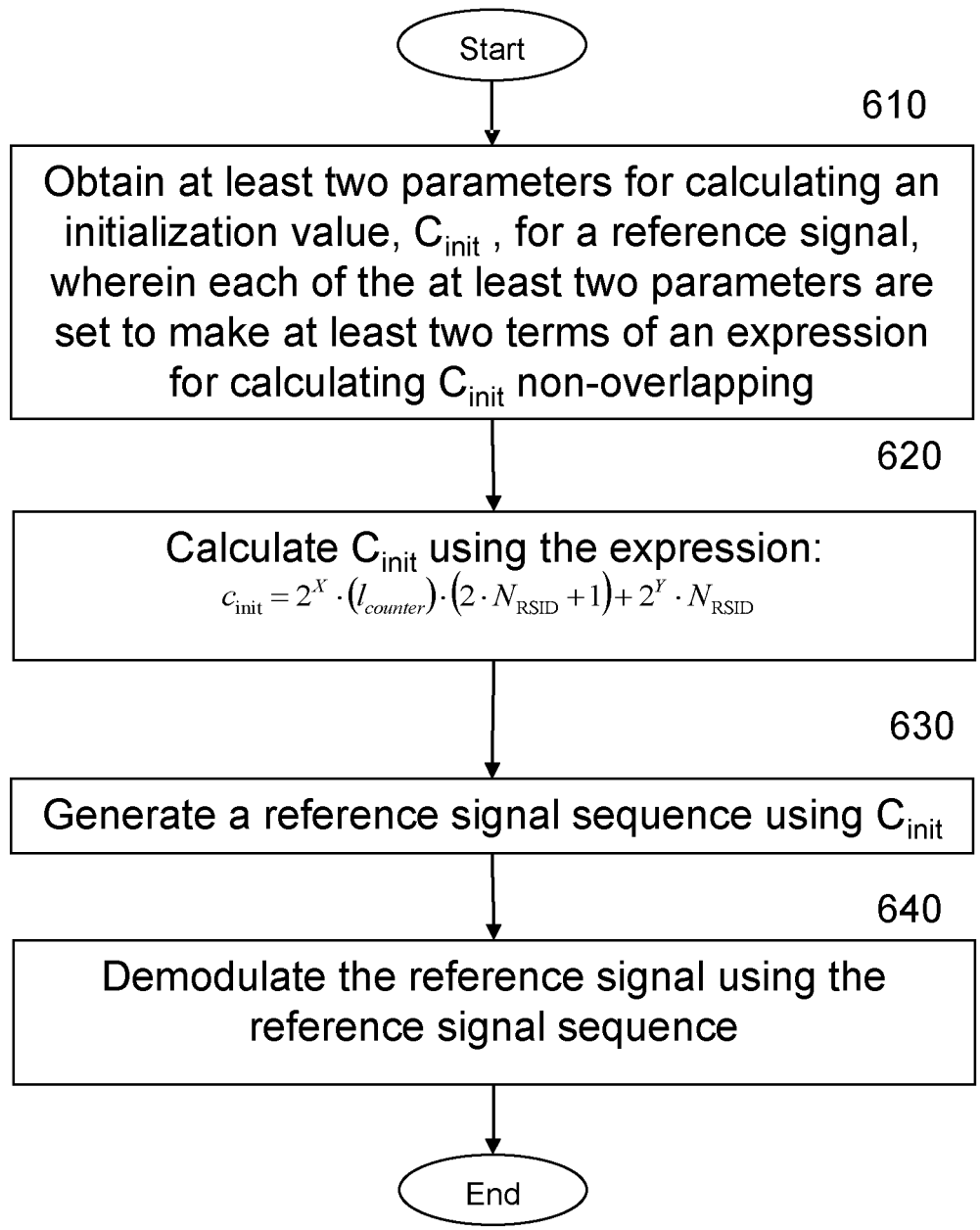
FIG. 6 illustrates another example method by a radio node when receiving a RS, according to certain embodiments.

FIG. 6 illustrates another example method by a radio node when receiving a RS, according to certain embodiments. In a particular embodiment, the radio node is a wireless device such as, for example, wireless device 110. In another particular embodiment, the radio node is a network node such as, for example, network node 100a or 100b.

At step 610, the radio node obtains at least two parameters for calculating an initialization value, $C_{init}$, for a reference signal. In a particular embodiment, the reference signal comprises at least one of a CSI-RS, a TRS, a DMRS, and a PRS. In a particular embodiment, the reference signal is a CSI-RS and the parameter associated with the reference signal type is based on a use of the CSI-RS. The use of the CSI may include beam management or CSI acquisition.

At step 630, the radio node calculates $C_{init}$ using the following expression:

$$c_{init}=2^X \cdot (l_{counter}) \cdot (2 \cdot n_{ID}+1)+2^Y \cdot n_{ID}+n_{RStype}$$

wherein:
$n_{RStype}$ is an additional parameter associated with the reference signal type,
$l_{counter}$ is a symbol counter associated with a time unit of a radio frame,
$n_{ID}$ is a UE specific reference signal identifier, and
X and Y comprise first and second parameters affecting different bits in a binary representation of the quantity $C_{init}$.

In a particular embodiment, $n_{ID}$ may be received from a network node. In a particular embodiment, $n_{ID}$ may be specifically configured for the radio node.

At step 640, the radio node generates a reference signal sequence using $C_{init}$.

At step 650, the radio node demodulates the reference signal using the reference signal sequence.

Figure 7:
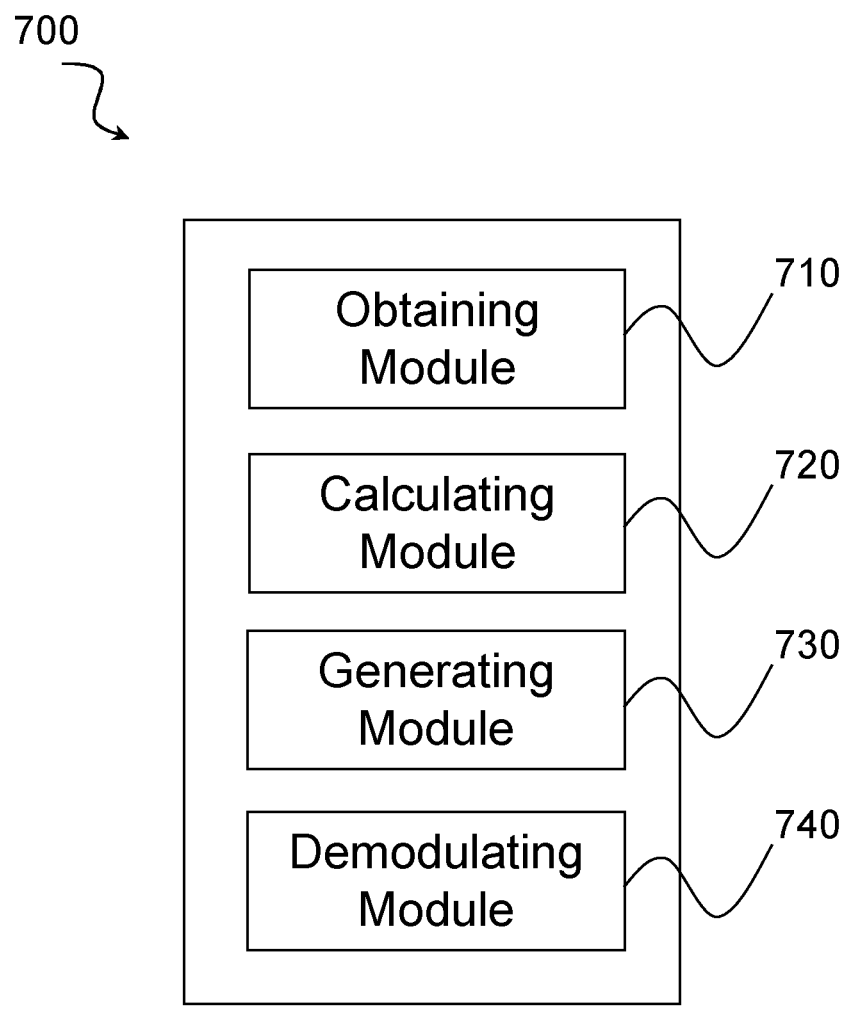
FIG. 7 illustrates another virtual apparatus in a wireless network, according to certain embodiments.

FIG. 7 illustrates a schematic block diagram of a virtual apparatus 700 in a wireless network (for example, the wireless network shown in FIG. 1). The apparatus may be implemented in a wireless device or network node (e.g., wireless device 110 or network node 120 shown in FIG. 1). Apparatus 700 is operable to carry out the example method described with reference to FIG. 6 and possibly any other processes or methods disclosed herein. It is also to be understood that the method of FIG. 6 is not necessarily carried out solely by apparatus 700. At least some operations of the method can be performed by one or more other entities.

Virtual Apparatus 700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining module 710, calculating module 720, generating module 730, demodulating module 740, and any other suitable units of apparatus 700 to perform corresponding functions according one or more embodiments of the present disclosure.

According to certain embodiments, obtaining module 710 may perform certain of the obtaining functions of the apparatus 700. For example, obtaining module 710 may obtain at least two parameters for calculating an initialization value, $C_{init}$, for a reference signal.

According to certain embodiments, calculating module 720 may perform certain of the calculating functions of the apparatus 700. For example, calculating module 720 may calculate $C_{init}$ using the following expression:

$$c_{init}=2^X \cdot (l_{counter}) \cdot (2 \cdot n_{ID}+1)+2^Y \cdot n_{ID}+n_{RStype}$$

wherein:
$n_{RStype}$ is an additional parameter associated with the reference signal type,
$l_{counter}$ is a symbol counter associated with a time unit of a radio frame,
$n_{ID}$ is a UE specific reference signal identifier, and
X and Y comprise first and second parameters affecting different bits in a binary representation of the quantity $C_{init}$.

According to certain embodiments, generating module 730 may perform certain of the generating functions of the apparatus 700. For example, generating module 730 may generate a reference signal sequence using $C_{init}$.

According to certain embodiments, demodulating module 740 may perform certain of the demodulating functions of the apparatus 700. For example, demodulating module 740 may demodulate the reference signal using the reference signal sequence.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 8:
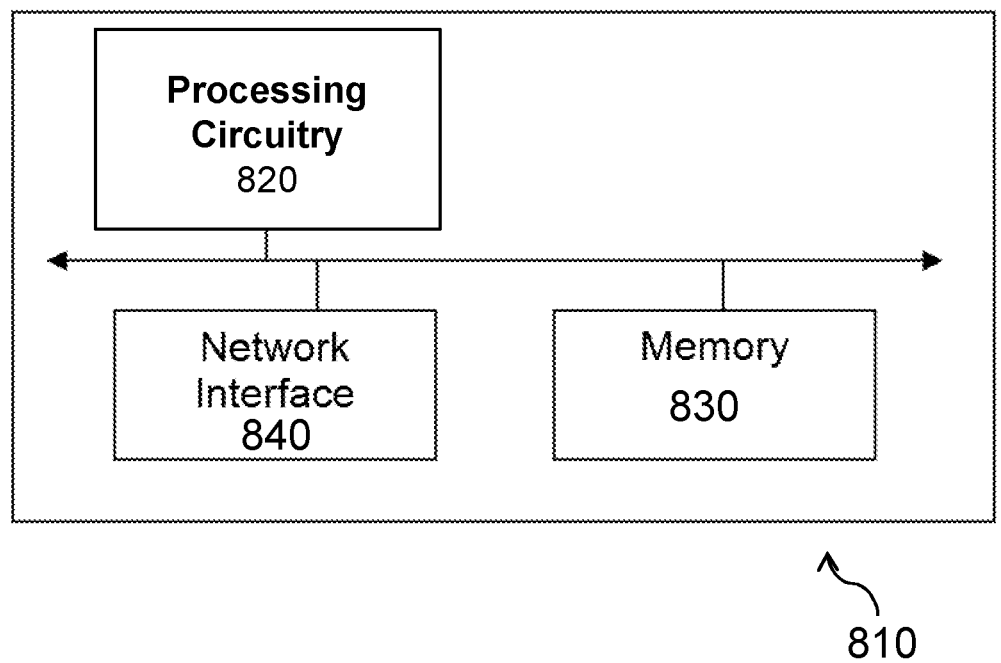
FIG. 8 illustrates an exemplary radio network controller or core network node 810, in accordance with certain embodiments.

FIG. 8 is a schematic block diagram of an exemplary radio network controller or core network node 810, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 810 includes processor 820, memory 830, and network interface 840. In some embodiments, processor 820 executes instructions to provide some or all of the functionality described above as being provided by the network node 100. Memory 830 stores the instructions executed by processor 820, and network interface 840 communicates signals to any suitable node, such as a gateway, switch, router, internet, Public Switched Telephone Network (PSTN), network nodes 100, radio network controllers or core network nodes 810, etc.

Processor 820 may include any suitable combination of hardware and software implemented in one or more modules to execute instructions and manipulate data to perform some or all of the described functions of the radio network controller or core network node 810. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for the network node, send output from the network node, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of the network node may include additional components beyond those shown in FIG. 8 that may be responsible for providing certain aspects of the network node's functionality, including any of the functionality described above and/or any additional functionality (including any functionality necessary to support the embodiments described above).

Figure 9:
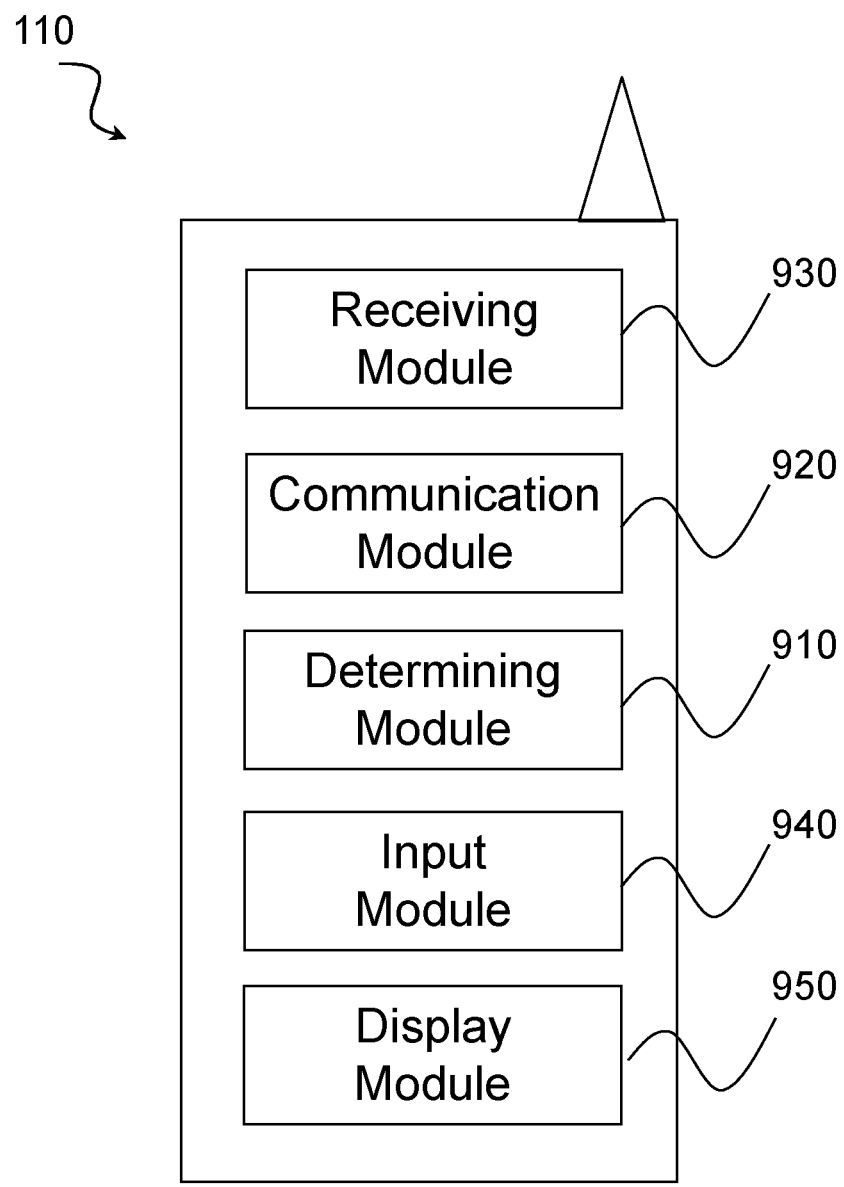
FIG. 9 illustrates an exemplary wireless device, in accordance with certain embodiments.

FIG. 9 is a schematic block diagram of an exemplary wireless device 110, in accordance with certain embodiments. Wireless device 110 may include one or more modules. For example, wireless device 110 may include a determining module 910, a communication module 920, and a receiving module 930. Optionally, wireless device 110 may include an input module 940, a display module 950, and any other suitable modules. Wireless device 110 may perform any of the functions described above in regards to FIGS. 1-7.

Determining module 910 may perform the processing functions of wireless device 110. In certain embodiments, wireless device 110 may perform any of the functions described above with respect to FIGS. 1-7. Determining module 910 may include or be included in one or more processors, such as processor 112 described above in relation to FIG. 1. In some embodiments, determining module 910 may calculate $C_{init}$ using one or more parameters. For example, determining module 910 may calculate $C_{init}$ using previously obtained parameters $n_{RStype}$, $N_{RSID}$, and/or 1. In some embodiments $N_{RSID}$ may be a configured default value associated with wireless device 110. In some embodiments, determining module may use the calculated value of $C_{init}$ to generate a RS sequence and demodulate the RS.

Determining module 910 may include analog and/or digital circuitry configured to perform any of the functions of determining module 910 and/or processor 112 described above. The functions of determining module 910 described above may, in certain embodiments, be performed in one or more distinct modules.

Communication module 920 may perform the communication functions of wireless device 110. In certain embodiments, communication module 920 may perform any of the communication functions described above with respect to FIGS. 1-7. Communication module 920 may transmit messages to one or more of network nodes 100*a-b* of the wireless network described in FIG. 1. Communication module 920 may include a transmitter and/or a transceiver, such as interface 111 and/or antenna 114 described above in relation to FIG. 1. Communication module 920 may include circuitry configured to wirelessly transmit messages and/or signals. In particular embodiments, communication module 920 may receive messages and/or signals for transmission from determining module 910. In certain embodiments, the functions of communication module 920 described above may be performed in one or more distinct modules.

Receiving module 930 may perform the receiving functions of wireless device 110. In certain embodiments, receiving module 930 may perform any of the receiving functions of wireless device 110 described above with respect to FIGS. 1-7. Receiving module 930 may include a receiver and/or a transceiver, such as interface 111 and/or antenna 114 described above in relation to FIG. 1. In some embodiments, receiving module 930 may receive $N_{RSID}$ from network node 100. Receiving module 930 may include circuitry configured to wirelessly receive messages and/or signals. In particular embodiments, receiving module 930 may communicate received messages and/or signals to determining module 910.

Optionally, wireless device 110 may include input module 940. Input module 940 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 910.

Optionally, wireless device 110 may include display module 950. Display module 950 may present signals on a display of wireless device 110. Display module 950 may include the display and/or any appropriate circuitry and hardware configured to present signals on the display. Display module 950 may receive signals to present on the display from determining module 910.

Determining module 910, communication module 920, receiving module 930, input module 940, and display module 950 may include any suitable configuration of hardware and/or software. Wireless device 110 may include additional modules beyond those shown in FIG. 1 that may be responsible for providing any suitable functionality, including any of the functionality described above and/or any additional functionality (including any functionality necessary to support the various solutions described herein).

Figure 10:
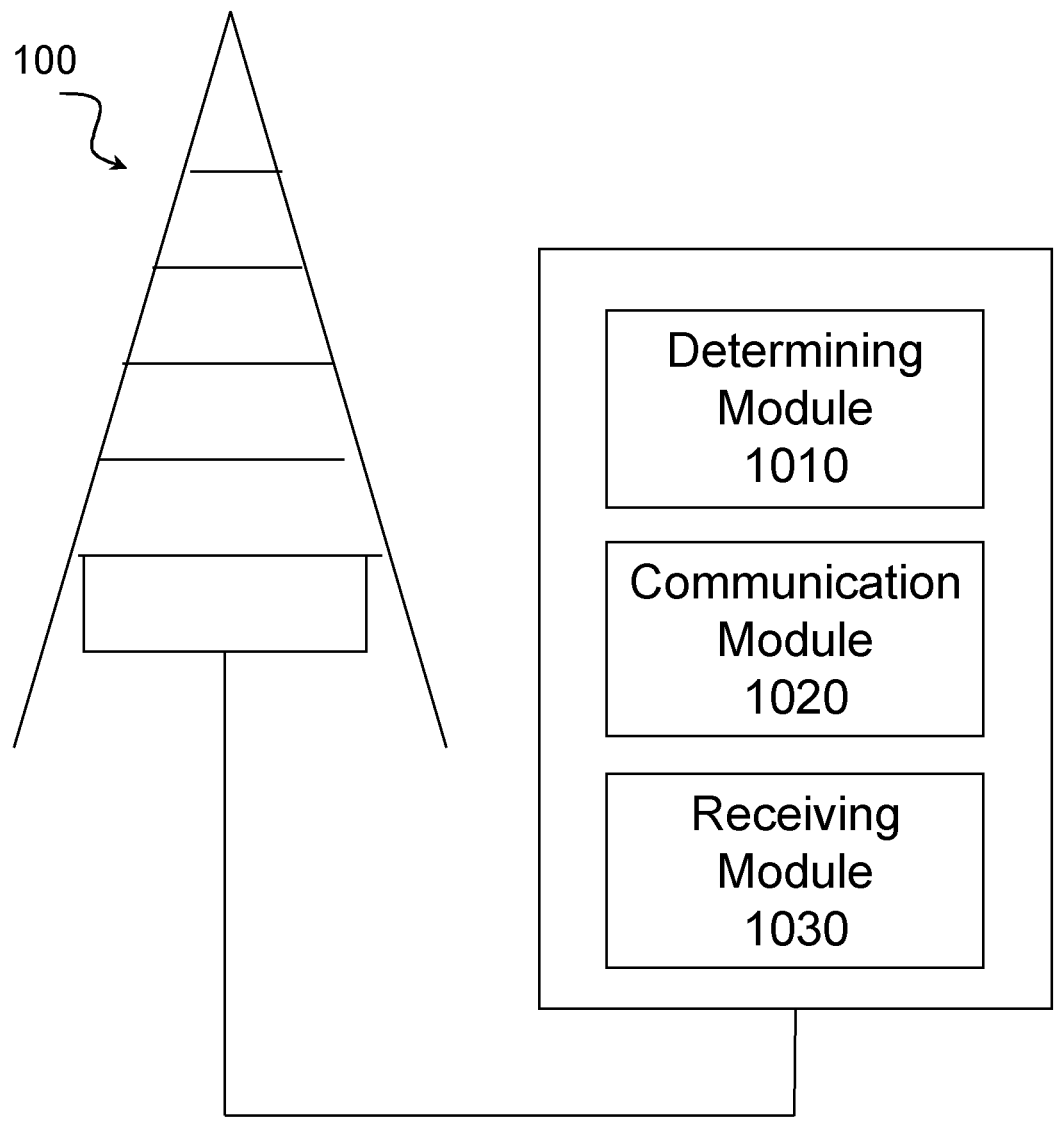
FIG. 10 illustrates an exemplary network node, in accordance with certain embodiments.

FIG. 10 is a block schematic of an exemplary network node 100, in accordance with certain embodiments. Network node 100 may include one or more modules. For example, network node 100 may include determining module 1010, communication module 1020, receiving module 1030, and any other suitable modules. In some embodiments, one or more of determining module 1010, communication module 1020, receiving module 1030, or any other suitable module may be implemented using one or more processors, such as processor 102 described above in relation to FIG. 1. In certain embodiments, the functions of two or more of the various modules may be combined into a single module. Network node 100 may perform one or more steps associated with the embodiments described above in reference to FIGS. 1-7.

Determining module 1010 may perform the processing functions of network node 100. In certain embodiments, determining module 1010 may perform any of the functions of network node described above with respect to FIGS. 1-7. Determining module 1010 may include or be included in one or more processors, such as processor 102 described above in relation to FIG. 1. Determining module 1010 may include analog and/or digital circuitry configured to perform any of the functions of determining module 1010 and/or processor 102 described above. In certain embodiments some of the functionality of determining module 1010 may be performed by an allocation module.

Communication module 1020 may perform the transmission functions of network node 100. In certain embodiments, network node 100 may perform any of the functions of the node described above with respect to FIGS. 1-7. In one example embodiment, communication module 1020 may transmit an indication or value for $N_{RSID}$ to wireless device 110.

Communication module 1020 may transmit messages to one or more of wireless devices 110. Communication module 1020 may include a transmitter and/or a transceiver, such as interface 101 described above in relation to FIG. 1. Communication module 1020 may include circuitry configured to wirelessly transmit messages and/or signals. In particular embodiments, communication module 1020 may receive messages and/or signals for transmission from determining module 1010 or any other module.

Receiving module 1030 may perform the receiving functions of network node 100. In certain embodiments, receiving module 1030 may perform any of the functions of network node 100 described in FIGS. 1-3. Receiving module 1030 may receive any suitable information from wireless device 110. Receiving module 1030 may include a receiver and/or a transceiver, such as interface 101 and/or antenna 104, which are described above in relation to FIG. 1. Receiving module 1030 may include circuitry configured to wirelessly receive messages and/or signals. In particular embodiments, receiving module 1030 may communicate received messages and/or signals to determining module 1010 or any other suitable module.

Determining module 1010, communication module 1020, and receiving module 1030 may include any suitable configuration of hardware and/or software. Network node 100 may include additional modules beyond those shown in FIG. 10 that may be responsible for providing any suitable functionality, including any of the functionality described above and/or any additional functionality (including any functionality necessary to support the various embodiments described herein).

Example Embodiments

According to certain embodiments, a method in a wireless device comprises:
    obtaining one or more parameters for calculating an initialization value, $C_{init}$, for a reference signal;
    calculating $C_{init}$ using at least one of the one or more parameters;
    generating a reference signal sequence using $C_{init}$; and
    demodulating the reference signal using the reference signal sequence;
    optionally, the one or more parameters comprise: $N_{RStype}$, $N_{RSID}$, and $l_{counter}$;
    optionally, $C_{init}$ is calculated according to the equation:

$$c_{init}=2^X \cdot (l_{counter}) \cdot (2 \cdot N_{RSID}+1)+2^Y \cdot N_{RSID}+n_{RStype}$$

optionally, a value of the parameter $N_{RSID}$ is received from a network node;
    optionally, a value of the parameter $N_{RSID}$ is specifically configured for the wireless device;
    optionally, a value of the parameter $N_{RStype}$ is based on the reference signal;
    optionally, the reference signal is one selected from the group comprising:
        a channel state information reference signal (CSI-RS); and
        a tracking reference signal (TRS).
    optionally, the reference signal is a channel state information reference signal (CSI-RS) and the parameter $N_{RStype}$ is based on a use of the CSI-RS, wherein the use of the CSI-RS is one selected from the group comprising beam management and channel state information (CSI) acquisition.

According to certain embodiments, a wireless device comprises processing circuitry configured to:
    obtain one or more parameters for calculating an initialization value, $C_{init}$, for a reference signal;
    calculate $C_{init}$ using at least one of the one or more parameters;
    generate a reference signal sequence using $C_{init}$; and
    demodulate the reference signal using the reference signal sequence;
    optionally, the one or more parameters comprise: $N_{RStype}$, $N_{RSID}$, and $l_{counter}$;
    optionally, $C_{init}$ is calculated according to the equation:

$$c_{init}=2^X \cdot (l_{counter}) \cdot (2 \cdot N_{RSID}+1)+2^Y \cdot N_{RSID}+n_{RStype}$$

optionally, the wireless device further comprises an interface operably coupled to the processor and the interface is configured to receive a value of the parameter $N_{RSID}$ from a network node;

optionally, a value of the parameter $N_{RSID}$ is specifically configured for the wireless device;

optionally, a value of the parameter $N_{RStype}$ is based on the reference signal;

optionally, the reference signal is one selected from the group comprising:
 a channel state information reference signal (CSI-RS); and
 a tracking reference signal (TRS);

optionally, the reference signal is a channel state information reference signal (CSI-RS) and the parameter $N_{RStype}$ is based on a use of the CSI-RS, wherein the use of the CSI-RS is one selected from the group comprising beam management and channel state information (CSI) acquisition.

According to certain embodiments, a method in a network node comprises:
 obtaining one or more parameters for calculating an initialization value, $C_{init}$, for a reference signal;
 calculating $C_{init}$ using at least one of the one or more parameters;
 generating a reference signal sequence using $C_{init}$; and
 demodulating the reference signal using the reference signal sequence;

optionally, the one or more parameters comprise: $N_{RStype}$, $N_{RSID}$, and $1_{counter}$;

optionally, $C_{int}$ is calculated according to the equation:

$$c_{init}=2^X \cdot (l_{counter}) \cdot (2 \cdot N_{RSID}+1)+2^Y \cdot N_{RSID}+n_{RStype}$$

optionally, a value of the parameter $N_{RSID}$ is configured for a specific wireless device;

optionally, a value of the parameter $N_{RStype}$ is based on the reference signal;

optionally, the reference signal is a demodulation reference signal (DM-RS);

optionally, the reference signal is a demodulation reference signal (DM-RS) and the parameter $N_{RStype}$ is based on whether the DMRS is for PUSCH or PUCCH;

optionally, $N_{RStype}$ is based on whether the PUSCH is slot based or mini-slot based;

According to certain embodiments, a network node comprises processing circuitry configured to:
 obtain one or more parameters for calculating an initialization value, $C_{init}$, for a reference signal;
 calculate $C_{init}$ using at least one of the one or more parameters;
 generate a reference signal sequence using $C_{init}$; and
 demodulate the reference signal using the reference signal sequence;
 optionally, the one or more parameters comprise: $N_{RStype}$, $N_{RSID}$, and $1_{counter}$;
 optionally, $C_{int}$ is calculated according to the equation:

$$c_{init}=2^X \cdot (l_{counter}) \cdot (2 \cdot N_{RSID}+1)+2^Y \cdot N_{RSID}+n_{RStype}$$

optionally, a value of the parameter $N_{RSID}$ is configured for a specific wireless device;

optionally, a value of the parameter $N_{RStype}$ is based on the reference signal;

optionally, the reference signal is a demodulation reference signal (DM-RS);

optionally, the reference signal is a demodulation reference signal (DM-RS) and the parameter $N_{RStype}$ is based on whether the DMRS is for PUSCH or PUCCH; and optionally, $N_{RStype}$ is based on whether the PUSCH is slot based or mini-slot based.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

| Abbreviation | Explanation |
| --- | --- |
| 3GPP | 3rd Generation Partnership Project |
| ACS | Adjacent Channel Selectivity |
| CP | Cyclic Prefix |
| CSI-RS | Channel state information reference signal |
| D2D | Device to Device |
| DMRS | Demodulation reference signals |
| E-UTRA | Enhanced Universal Terrestrial Radio Access |
| GHz | Giga-Hertz |
| gNB | 5G Node B |
| KHz | Kilo-Hertz |
| LTE | Long Term Evolution |
| MBB | Mobile Broadband |
| MHz | Mega-Hertz |
| MTC | Machine Type Communication |
| NR | New Radio |
| OFDM | Orthogonal Frequency Division Multiplexing |
| PDCCH | Physical Downlink Control Channel |
| PDSCH | Physical Downlink Shared Channel |
| PTRS | Phase tracking reference signals |
| PUCCH | Physical Uplink Control Channel |
| PUSCH | Physical Uplink Shared Channel |
| PRB | Physical Resource Blocks |
| PRS | Positioning Reference Signal |
| RAT | Radio Access Technology |
| RE | Resource element |
| SCS | Subcarrier Spacing |
| TDM | Time division multiplex |
| TRS | Tracking Reference Signal |
| TTI | Transmission Time Interval |

-continued

| Abbreviation | Explanation |
| --- | --- |
| URLLC | Ultra Reliable Low Latency Communication |
| USEC | Micro Seconds |
| UTRA | Universal Terrestrial Radio Access |
| V2V | Vehicle to Vehicle |
| V2X | Vehicle to Infrastructure |

The invention claimed is:

1. A method in a radio node, the method comprising:
for calculating an initialization value, $C_{init}$, for a reference signal, obtaining a parameter associated with a reference signal type;
calculating $C_{init}$ using an equation and using at least the parameter associated with the reference signal type, wherein the $C_{init}$ is a function of the reference signal type, such that with a different reference signal type, a different $C_{init}$ is calculated using the equation;
generating a reference signal sequence using $C_{init}$; and
demodulating the reference signal using the reference signal sequence.

2. The method of claim 1, wherein $C_{init}$ is calculated using at least one additional parameter, the at least one additional parameter comprising a reference signal identifier, $n_{ID}$, and/or a symbol counter, $l_{counter}$.

3. The method of claim 2, wherein the reference signal identifier, $n_{ID}$, is specific to a user equipment (UE).

4. The method of claim 2, wherein $C_{init}$ is calculated according to the equation:

$$c_{init}=2^X \cdot (l_{counter}) \cdot (2 \cdot n_{ID}+1)+2^Y \cdot n_{ID}+n_{RStype}$$

wherein:
$n_{RStype}$ is the parameter associated with the reference signal type,
$l_{counter}$ is a symbol counter associated with a time unit of a radio frame, and
X and Y comprise first and second parameters affecting different bits in a binary representation of the quantity $C_{init}$.

5. The method of claim 2, wherein $C_{init}$ is calculated according to the equation:

$$c_{init}=2^X \cdot \text{XOR}((l_{counter}) \cdot (2 \cdot n_{ID}+1), n_{RStype})+2^Y \cdot n_{ID}$$

wherein:
$n_{RStype}$ is the parameter associated with the reference signal type,
$l_{counter}$ is a symbol counter associated with a time unit of a radio frame, and
X and Y comprise first and second parameters affecting different bits in a binary representation of the quantity $C_{init}$.

6. The method of claim 4, wherein $l_{counter}$ is associated with a wraparound limit.

7. The method of claim 2, wherein a value of the parameter $n_{ID}$ is received from a network node.

8. The method of claim 2, wherein a value of the parameter $n_{ID}$ is specifically configured for the radio node.

9. The method of claim 1, wherein $C_{init}$ is calculated according to the equation:

$$c_{init}=2^{10} \cdot f((l+14 \cdot n_s) \bmod N, n_{ID}, n_{RStype})+n_{ID}$$

wherein:
$n_{RStype}$ is the parameter associated with the reference signal type,
$f((l+14 \cdot n_s) \bmod N, n_{ID}, n_{RStype})$ and N are selected to use a maximum of 21 bits,
$n_{ID}$ is a UE-specific identifier for the reference signal, and
$n_s$ is a slot index within a frame.

10. The method of claim 1, wherein the reference signal comprises at least one of:
a channel state information reference signal (CSI-RS);
a tracking reference signal (TRS);
a demodulation reference signal (DMRS); and
a positioning reference signal (PRS).

11. The method of claim 1, wherein the reference signal is a channel state information reference signal (CSI-RS) and the parameter associated with the reference signal type is based on a use of the CSI-RS, wherein the use of the CSI-RS comprises beam management or channel state information (CSI) acquisition.

12. The method of claim 1, wherein the radio node is a wireless device.

13. The method of claim 1, wherein the radio node is a network node.

14. A radio node, comprising:
processing circuitry configured to:
for calculating an initialization value, $C_{init}$, for a reference signal, obtaining a parameter associated with a reference signal type;
calculate $C_{init}$ using an equation and using at least the parameter associated with the reference signal type, wherein the $C_{init}$ is a function of the reference signal type, such that with a different reference signal type, a different $C_{init}$ is calculated using the equation;
generate a reference signal sequence using $C_{init}$; and
demodulate the reference signal using the reference signal sequence.

15. The radio node of claim 14, wherein $C_{init}$ is calculated using at least one additional parameter, the at least one additional parameter comprising, a UE specific reference signal identifier, $n_{ID}$, and/or a symbol counter, $l_{counter}$.

16. The radio node of claim 15, wherein the reference signal identifier, $n_{ID}$, is specific to a user equipment (UE).

17. The radio node of claim 15, wherein $C_{init}$ is calculated according to the equation:

$$c_{init}=2^X \cdot (l_{counter}) \cdot (2 \cdot n_{ID}+1)+2^Y \cdot n_{ID}+n_{RStype}$$

wherein:
$n_{RStype}$ is the parameter associated with the reference signal type,
$l_{counter}$ is a symbol counter associated with a time unit of a radio frame, and
X and Y comprise first and second parameters affecting different bits in a binary representation of the quantity $C_{init}$.

18. The radio node of claim 15, wherein $C_{init}$ is calculated according to the equation:

$$c_{init}=2^X \cdot \text{XOR}((l_{counter}) \cdot (2 \cdot n_{ID}+1), n_{RStype})+2^Y \cdot n_{ID}$$

wherein:
$n_{RStype}$ is the parameter associated with the reference signal type,
$l_{counter}$ is a symbol counter associated with a time unit of a radio frame, and
X and Y comprise first and second parameters affecting different bits in a binary representation of the quantity $C_{init}$.

19. The radio node of claim 17, wherein $l_{counter}$ is associated with a wraparound limit.

20. The radio node of claim 15, wherein the wireless device further comprises an interface operably coupled to the processor and the interface is configured to receive a value of $n_{ID}$ from a network node.

21. The radio node of claim 15, wherein a value of $n_{ID}$ is specifically configured for the radio node.

22. The radio node of claim 14 wherein $C_{init}$ is calculated according to the equation:

$$c_{init}=2^{10} \cdot f((l+14 \cdot n_s) \bmod N, n_{ID}, n_{RStype}) + n_{ID}$$

wherein:
- $n_{Rstype}$ is the parameter associated with the reference signal type,
- $l$ is an OFDM symbol within a 14 symbols slot,
- $f((l+14 \cdot n_s) \bmod N, n_{ID}, n_{Rstype})$ and N are selected to use a maximum of 21 bits,
- $n_{ID}$ is a UE-specific identifier for the reference signal, and
- $n_s$ is a slot index within a frame.

23. The radio node of claim 14, wherein the reference signal comprises at least one of:
- a channel state information reference signal (CSI-RS);
- a tracking reference signal (TRS);
- a demodulation reference signal (DMRS); and
- a positioning reference signal (PRS).

24. The radio node of claim 14, wherein the reference signal is a channel state information reference signal (CSI-RS) and the parameter associated with the reference signal type is based on a use of the CSI-RS, wherein the use of the CSI-RS comprises beam management or channel state information (CSI) acquisition.

25. The radio node of claim 14, wherein the radio node comprises a wireless device.

26. The radio node of claim 14, wherein the radio node comprises a network node.

* * * * *